No. 707,970. Patented Aug. 26, 1902.
T. P. KEENAN.
HEATER, RADIATOR, OR STOVE.
(Application filed Feb. 26, 1902.)
(No Model.) 2 Sheets—Sheet 1.
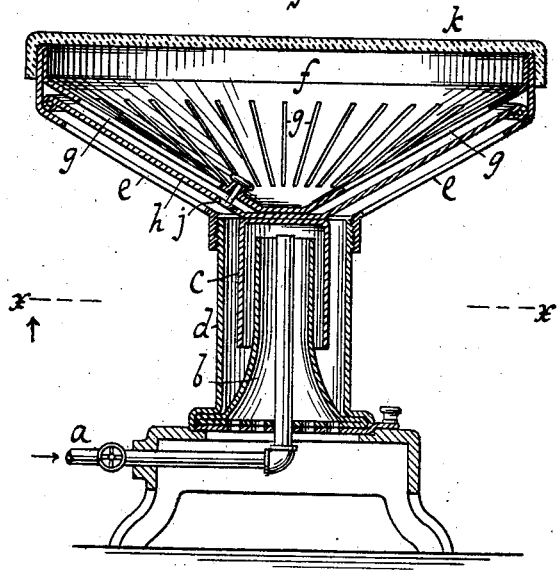
Fig. 1.
Fig. 2.
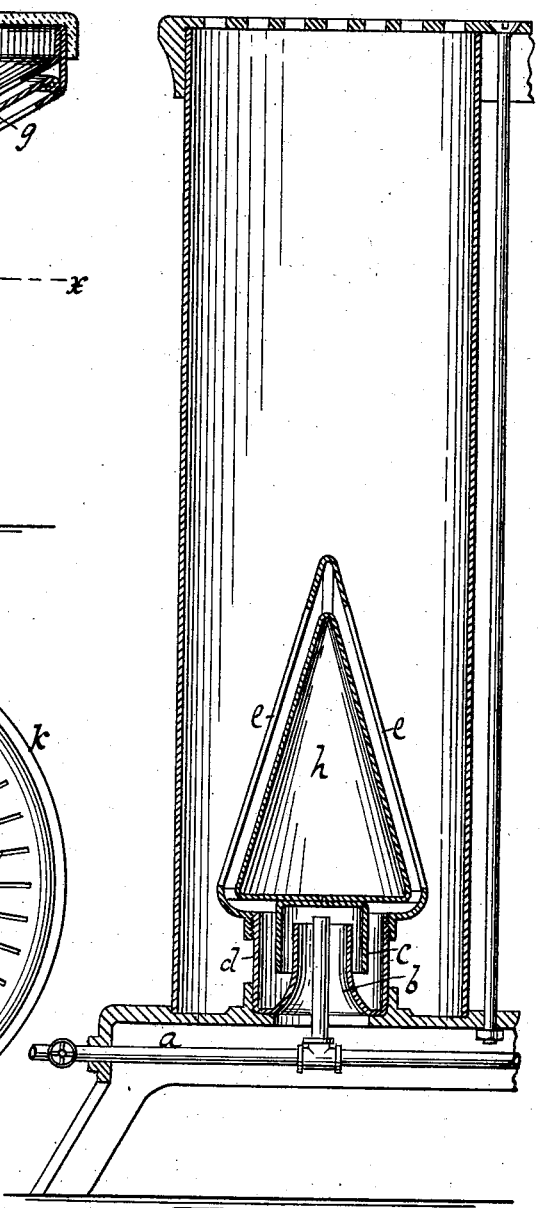
Fig. 3.
WITNESSES:
William Miller
Chas E. P Ensign
INVENTOR
Thomas P. Keenan
BY
W. C. Hauff
ATTORNEY
THE NORRIS PETERS CO., PHOTO-LITHO., WASHINGTON, D. C.

No. 707,970.　　　　　　　　　　　　　　Patented Aug. 26, 1902.
T. P. KEENAN.
HEATER, RADIATOR, OR STOVE.
(Application filed Feb. 26, 1902.)

(No Model.)　　　　　　　　　　　　　　2 Sheets—Sheet 2.

WITNESSES:
William Miller
Chas. E. Poensgen

INVENTOR
Thomas P. Keenan
BY
W. C. Hauff
ATTORNEY

UNITED STATES PATENT OFFICE.

THOMAS P. KEENAN, OF BROOKLYN, NEW YORK, ASSIGNOR OF ONE-HALF TO FREDERICK W. SPARKS, OF BROOKLYN, NEW YORK.

HEATER, RADIATOR, OR STOVE.

SPECIFICATION forming part of Letters Patent No. 707,970, dated August 26, 1902.

Application filed February 26, 1902. Serial No. 95,736. (No model.)

*To all whom it may concern:*

Be it known that I, THOMAS P. KEENAN, a citizen of the United States, residing at Brooklyn borough, New York city, county of Kings, and State of New York, have invented new and useful Improvements in Heaters, Radiators, or Stoves, of which the following is a specification.

This invention is adapted to thoroughly utilize the heat from a combustible mixture, such as gas and air, and to direct such heat as required or to secure efficient heating or radiation.

The invention resides in the features set forth in the following specification and claims and illustrated in the annexed drawings, in which—

Figure 4:
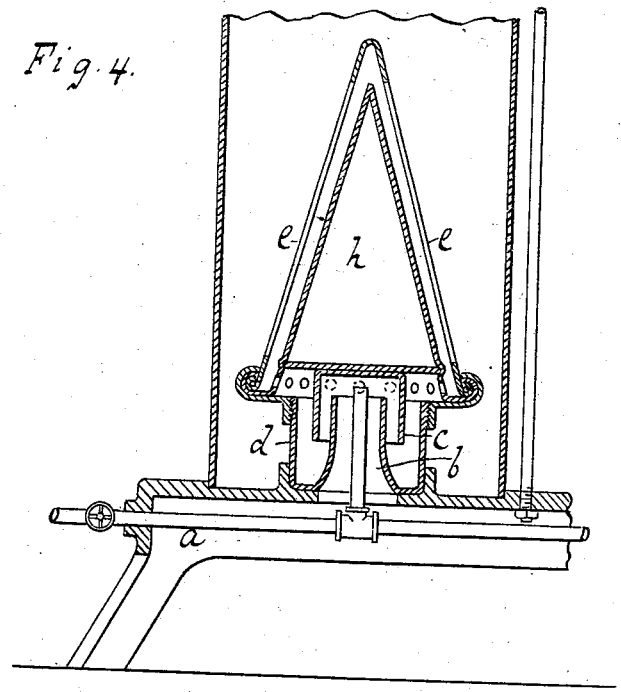
Figure 5:
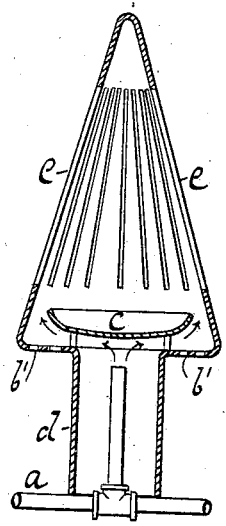

Figure 1 is a sectional elevation of a stove or burner embodying this invention. Fig. 2 is a section along $xx$, Fig. 1. Fig. 3 is a sectional view of a modification. Figs. 4 and 5 show modifications.

In the drawings is shown what may be called a "conical" chamber or chamber having conical walls $e$ and $h$. The wall $e$ has exit-slots or burner-openings for the combustible or mixture, which being ignited will produce a layer or sheet of flame surrounding or heating wall $e$ and being reflected or radiated therefrom. The chamber or space between walls $e\ h$ communicates with a mixer having a deflector and a gas or combustible supply, as also an air-supply. The mixer is shown at $d$ readily formed as a tube or round shell or other suitable shape. The deflector $c$ can be compared to an inverted cup, having its closed top secured or riveted to the bottom or lower portion of chamber-wall $h$. The air-tube is shown at $b$ and the combustible-supply or gas pipe at $a$. The mixer $d$ extends downwardly from outside the chamber $e\ h$, and the deflector in the mixer also extends downwardly or dips between the walls $b\ d$, so that the gas and air passing first down or away from the conical chamber and then up into the same are thoroughly mixed before coming to flame at the burner-slots. The outer wall $d$ is open at the bottom—that is, it allows the insertion of the tapering tube or frustum-shaped shell $b$. The latter is open at top and bottom and is secured at its lower edge to the lower edge of the tube $d$, the deflector $c$ extending or dipping part way down between these tubes $b\ d$. The lower edges of tubes $b$ and $d$ being formed of one size or made to fit can be readily beaded or flanged or otherwise secured to one another. The bottom of the outer mixer-wall $d$ being thus closed the air passes upwardly through the tube $b$, thence downwardly between the deflector $c$ and tube $b$, thence upwardly between the tube $d$ and deflector $c$ to the conical chamber. The conical chamber could have oppositely-located combustion exits or slots.

In Fig. 1 is shown a further wall or cone $f$ with slots, openings, or burners $g$ opening upwardly or opposite to the slots in wall $e$. A cover $k$, of asbestos or suitable material, can be placed over chamber-wall $f$, or a cooking utensil or other article to be warmed can be supported over the flame-openings of this inner wall $f$, throwing the heat upward and inward or toward a certain apex. The heat from the outer burners in a device as shown in Fig. 1 being directed outward and downward tends to warm the floor or lower part of a room, so as to make, for example, a satisfactory footwarmer. A valve $i$ can be arranged to shut off combustible from inner chamber $f\ h$, if desired.

The deflector $d$ being detachably connected or screwed to the conical chamber can be removed when required, as for cleaning or repair.

The device can be variously applied or modified. In Fig. 3 is shown a conical chamber, but tapering upward instead of downward, as in Fig. 1. The combustion-chamber in Fig. 3 when placed in a tube of a radiator or gas-heater will cause a broad body of flame to be thrown out at or near the bottom of the radiator-tube, so that the radiator is warmed or heated not only at its top or upper portion, but also farther down.

A damper of any suitable construction can be applied to regulate the flow or entry of air into tube $b$.

The construction or method of assembling the parts can be of any suitable character. In Fig. 3 the walls or cones are shown with connecting-braces, and in Fig. 4 they are connected by beading or flanging, or any suitable method known in the art of metal spinning or working can be adopted.

In the modification shown in Fig. 5 the deflector $c$ causes a mixture of the gas from pipe $a$ and the air entering an inlet $b'$, so that the desired flame is obtained at burners or slits $e$.

What I claim as new, and desire to secure by Letters Patent, is—

1. As a new article of manufacture, a gas heating device comprising a chamber having a plurality of conical walls and exit-openings for the gas, a mixer having a deflector extending downwardly within the same from the conical chamber, and a gas and air supply for the mixer.

2. A gas heating device comprising a conical chamber with a plurality of walls, said chamber provided with exit-openings, and a mixing-chamber located outside the conical chamber and having a deflector leading the mixture away from the conical chamber, so that the mixing is complete before the combustible enters the said conical chamber.

3. A gas heating device having a chamber with burner-openings and a mixer comprising an outer wall open at the bottom, an inner frustum-shaped or tapering tube secured at its lower edge to the lower edge or bottom of the outer wall, and a deflector closed at top and open at bottom and made to extend part way down between the outer wall and the taper tube, so as to compel air and gas rising or entering by way of the taper tube to descend before entering and rising in the outer wall.

4. A gas heating device having a chamber with burner-openings and a mixer comprising an outer wall with open top, a tapered tube open at top and bottom and made to fit the bottom of the outer wall, and a deflector made to dip down between the tube and outer wall and separate from said tube.

5. A conical chamber having oppositely-located combustion-openings, and means forming a mixing-chamber for supplying combustible to and for supporting the conical chamber.

6. A conical or upwardly-expanding chamber having oppositely-located combustion-openings for throwing heat outwardly and downwardly and also inwardly and upwardly, combined with a mixing-chamber.

7. A heating device comprising outer and inner conical chambers provided with oppositely-located burner-openings, a mixer outside of and made to communicate with the chambers, a deflector, and gas and air supplies for the mixer.

8. A gas heating device, consisting of a chamber formed of a plurality of walls and provided with gas-exit openings, a mixing-tube for supporting said chamber a deflector connected to said walls and depending downwardly within and separated from said mixing-tube and a suitable gas and air supply therefor.

In testimony whereof I have hereunto set my hand in the presence of two subscribing witnesses.

THOMAS P. KEENAN.

Witnesses:
CHAS. E. POENSGEN,
E. F. KASTENHUBER.